(12) United States Patent
Krach et al.

(10) Patent No.: US 7,147,018 B2
(45) Date of Patent: Dec. 12, 2006

(54) FILLING FITTING FOR A MOTOR VEHICLE FUEL TANK WITH AN AUTOMATIC CLOSURE

(75) Inventors: Martin Krach, Pleinfeld (DE); Reinhard Enzelberger, Dittenheim (DE)

(73) Assignee: Alfmeier Prazision AG Baugruppen und Systemlosungen (DE)

( * ) Notice: Subject to any disclaimer, the term of this patent is extended or adjusted under 35 U.S.C. 154(b) by 298 days.

(21) Appl. No.: 10/909,737

(22) Filed: Jul. 30, 2004

(65) Prior Publication Data

US 2005/0082288 A1  Apr. 21, 2005

(30) Foreign Application Priority Data

Aug. 8, 2003 (DE) ................ 103 36 776

(51) Int. Cl.
*B65B 1/04* (2006.01)
(52) U.S. Cl. .............. 141/301; 141/326; 220/86.2; 220/DIG. 33
(58) Field of Classification Search ............. 141/59, 141/285, 301, 348–350; 220/86.2, DIG. 33
See application file for complete search history.

(56) References Cited

U.S. PATENT DOCUMENTS 5,027,868 A * 7/1991 Morris et al. ............. 141/59
5,431,199 A * 7/1995 Benjay et al. ............. 141/59
6,446,826 B1 * 9/2002 Foltz et al. ............. 220/86.2

FOREIGN PATENT DOCUMENTS

| DE | 19709416 | 3/1997 |
| EP | 0788917 A2 | 8/1997 |
| WO | WO 03010022 | 2/2003 |

OTHER PUBLICATIONS

German Office Action dated Jul. 1, 2004 with English translation, German Patent and Trademark Office.

* cited by examiner

*Primary Examiner*—Timothy L. Maust
(74) *Attorney, Agent, or Firm*—Dority & Manning, P A

(57) ABSTRACT

The invention concerns a filling fitting for a fuel tank of a motor vehicle having an automatic tank closure. The filling fitting includes a carrier with an inlet opening and a closure cover, which closes the inlet opening with a sealing element. An upper side of the closure cover has a closure component, which, in a closed position of the closure cover, penetrates the inlet opening. Above the carrier is a circumferential section placed directly or indirectly on a supporting closure ring. The section extends inward to coact with closure elements on the closure component in the manner of a screw drive. To prevent permeation, in a force transmission path between the sealing element of the closure cover and the carrier, at least one axial, effective spring element is inserted.

28 Claims, 7 Drawing Sheets

FILLING FITTING FOR A MOTOR VEHICLE FUEL TANK WITH AN AUTOMATIC CLOSURE

FIELD OF THE INVENTION

The invention concerns a filling fitting for a fuel tank of a motor vehicle having an automatic tank closure.

BACKGROUND OF THE INVENTION

Filling fittings have been installed in order to make the tanking of vehicles easier. In the case of a system made known by WO 03/010022 A1, on the filling fitting is affixed a carrier with a square wall in which an entry opening is provided to receive a hand held pistol-nozzle for fuel injection. On the other side of carrier is a closure cover, which is pivotably set to rotate about a turning shaft transverse to the center line of the input opening, whereby, on the upper side of the closure cover is to be found a sealing element which works in conjunction with an opening rim which forms a seat for the sealing element. Further, on the upper side of the closure cover is affixed a closure component, which, in the closed position of a closure cover penetrates the inlet opening with an axial section. Carried on this axial section is a projecting closure element which extends itself radially outward. Finally, above the transverse wall is provided a supporting closure ring, which in turn carries a circumferential section, which extends itself radially inward. This acts in common with the closure elements in the manner of a screw drive or a bayonet connection, whereby the closure cover is pressed, with its sealing means, onto the underside of a transverse wall. The closure ring is so supported, that it is rotatable. Accordingly, in an initial turning position of the closure ring, the circumferential section thereof is beyond contact with the closure elements. Subsequently, in a second turning position, the circumferential section engages the closure elements from the underside. When this occurs, the closure cover with its seal, is pressed with an axial, effective force against the under side of the transverse wall.

In the case of the disclosure regarding filling fittings made by WO 03/010022, the closure ring supports itself directly on the carrier of the tank closure. So that the sealing assurance, with this arrangement, is sufficient, the requirement is, that the closure cover, or better, the plane thereof, be aligned exactly parallel to the plane of the closure ring. The same applies in the case of the counter surface of the transverse wall. When the parallelism of the components is not maintained, a danger exists, that the sealing element is not uniformly seated, but rests at an inclined angle and can circumferentially press with unequal forces against the seal seat. The result is, that no sufficient blocking means is present and fuel vapors can migrate into the surrounding atmosphere.

Even if the plane-parallelism of coacting components is assured, it can come about, that due to the action of the fuel or because of mechanical or thermal effects, that a distortion of the coacting components can occur, and this can lead especially to a swelling of the sealing element along with the therewith associated leakages. This is particularly true, if, in an aggressive manner, the swelling takes place in different circumferential sections of the sealing element. Beyond this, a completely swelled sealing element leads to an unmanageable increase of the force necessary to activate the closure ring.

BRIEF SUMMARY OF THE INVENTION

The invention provides an alternatively formed filling fitting with an automatic tank closure that addresses the permeable qualities of fuel.

In one aspect of the invention where the force transmission between the sealing element of the closure element and the transverse wall is concerned, at least one axially effective spring element is included.

A tank closure in the case of an invented filling fitting accommodates swelling and distortions due to mechanical and thermal effects since the spring element effects a partial compensation of both manufacturing tolerances and temperature variations and thereby assures a continually uniform and permeation free seating of the sealing element on its assigned seat. The compensation of manufacturing tolerances or of dimensional changes which are caused by operation, can be improved by the invention, in that the sealing element possesses on its upper side a projecting, thick lip which coacts with the sealing seat.

A First Embodiment

In the case of a preferred first embodiment example, the spring element, preferably of helical type, is placed under stress between underside of the closure ring and the upper side of the transverse wall. When this is done, then the spring element abuts itself on the wall area which surrounds the infeed opening of the transverse wall. The wall area has a relatively large diameter, which is a favorable feature, in the light of exercising a uniform pressure of the sealing element on its seat. In order to assure a rotary activation of the closure ring, in spite of the fact that the spring finds an abutment thereon, between the upper end face of the helical spring and the underside of the closure ring, a slide-ring is inserted. This has a plane surface extending itself transverse to the center line and also running parallel to the even planes of the closure ring of the sealing seats and of the closure cover. The slide-ring is affixed in a radial direction in the carrier, so that it lies in a cylindrical circumferential ring-space of the carrier between a cylindrical axial section of the closure ring and, at a radial clearance, an encompassing cylindrical circumferential wall of the carrier. Because the slide-ring is constructed as a member open at the bottom, it is convenient that an end of the helical spring can find recess in the U-shaped cross-section of the slide-ring, and in that anchorage be fixed and centered. Further, this arrangement prevents the spring from coming into contact with the closure ring and interfering with the rotational movement of the same.

The closure section is designed in bowl shape, the side wall of which is affixed on a cylindrical projection extending from the upper side of the closure cover, and which projection penetrates a central opening of the sealing element. The side wall carries on its free end a radial projecting flange, which encompasses an inner rim area of the sealing element and holds this securely on the closure cover.

A Second Embodiment

In the case of a further preferred embodiment, both the closure component as well as a spring element are placed on the upper side of the closure cover, whereby the closure component is axially movable and is pressed by the spring element against the upper side of the closure cover. In this case, the closure ring supports itself not on the spring element, but directly on the carrier, namely on an above situated, transverse wall thereof. Because of the central placement of the closure component as well as the spring element on the closure cover, a lesser space requirement is necessary, than is the case with the first embodiment example. The tank closure possesses in general a smaller diameter, so that a tank entry construction, possibly bowl-like, which encompasses the tank fuel intake fitting, can accordingly have smaller outside dimensioning, which is advantageous considering the cost of fabrication and the close installation clearances allowed by motor vehicles.

The stated central arrangement of the closure component and spring element allows the introduction of design and assembly technological advantages to be made in a simple manner, in that the closure component is constructed as a tube section on the upper end of which the closure elements are placed. In this case, the spring element is in stressed condition between a first support flange, which flange projects itself radially inward, and a second support flange, which is affixed at an axial separating distance onto the closure cover. Thereby, as already mentioned above, the closure component is axially movable, it can be axially displaced upward against the action of the spring element, when its closure element, from beneath encounters a loading by the closure ring. Advantageously, as a spring element, in this case a helical spring is employed.

So that the closure ring upon a rotation can press with its sealing element against sealing seat of the transverse wall, it becomes necessary that the closure component be affixed with freedom of rotation. Otherwise, upon a rotation impulse, the closure ring would likewise rotate. A preferred possibility of assuring such rotational freedom can be found therein, in that on the closure cover a guide shell is located which is fixed against rotational and axial movement. The guide shell on its upper end carries the second support flange and the circumferential wall of the same. Further the encasing wall of the shell coaxially encompasses an axial section of the closure component and is provided with axial slots which are penetratively engaged by the closure component. Thereby an assurance of the rotational fixation of the closure component is provided. Further, in this arrangement, an axial movement of the closure component can be carried out, since elements thereof are engaged in the axial slots. Because of the fact, that the axial slots open on the under side face of the guide shell, this can very easily be assembled during the mounting operation. Advantageously, the guide shell is axially and rotationally secured on a bolt, which bolt protrudes centrally out of the upper side of the closure cover. Even this formation is advantageous, from the standpoint of a simple mounting of the tank closure. One embodiment, wherein the rotational-fixation of the guide shell is improved, that is to say, which allows a transfer of greater torques between the guide shell and the closure cover, provides that between the under end of the guide shell and the upper side of the closure cover, an effective shape-fit in the rotational direction is available. Advantageously, in addition in the under side face of the guide shell in the direction of the circumference, spaced recesses are present, into which complementary projections on the upper side of the closure can engage.

BRIEF DESCRIPTION OF THE DRAWINGS

The above and other aspects of the present invention are apparent from the detailed description below in combination with the drawings in which.

DETAILED DESCRIPTION OF THE DRAWINGS

Figure 1A:
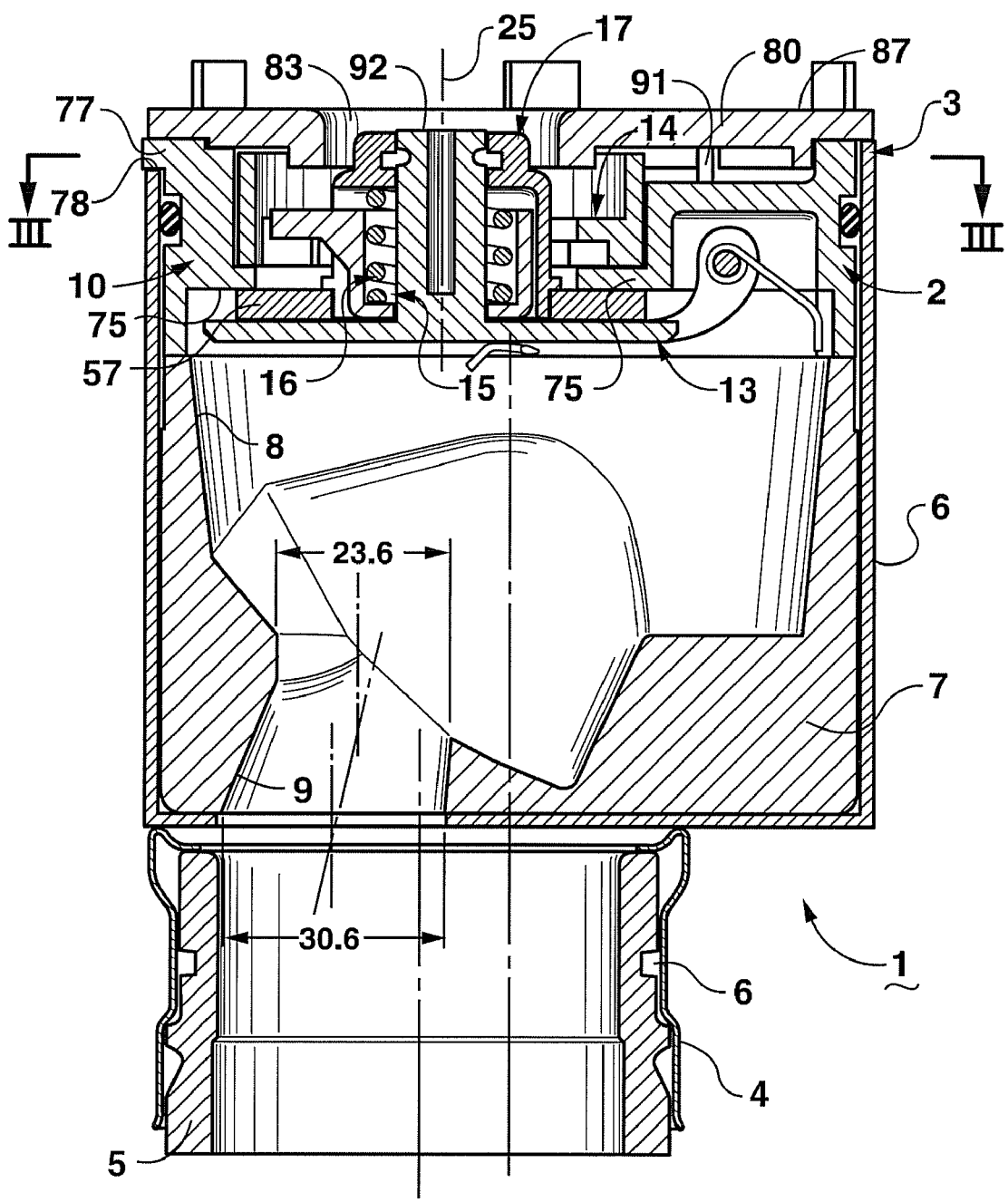
FIG. 1A is a cross sectional view of an upper end of a filling fitting with a tank closure placed therein.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

A First Embodiment

Figure 3:
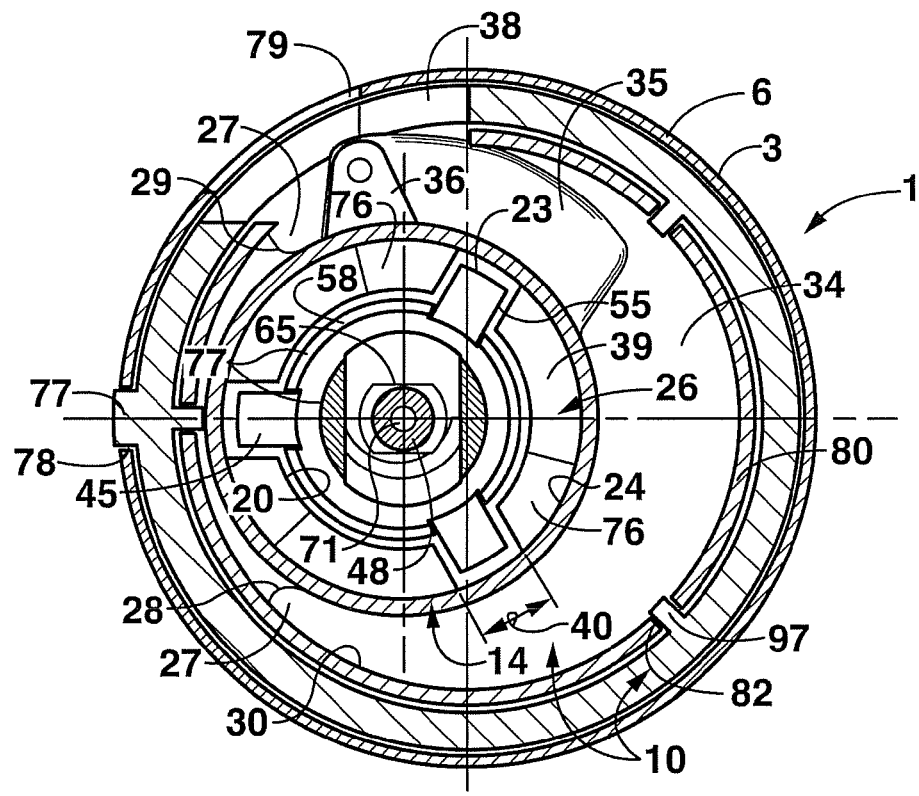
FIG. 3 is a cross-section through line III—III in FIG. 1A.
Figure 4:
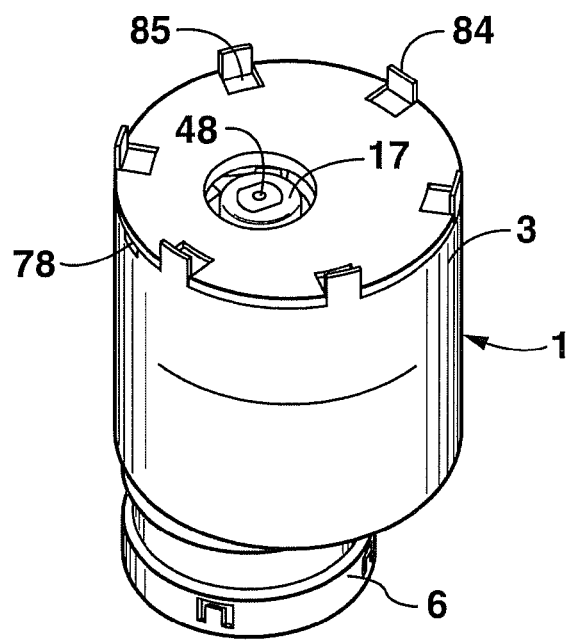
FIG. 4 is a perspective view of the filling fitting of FIG. 1A.

FIGS. 1, 3 and 4 show a filling fitting 1 with an integrated tank closure 2 in respectively different presentations. As may be seen in FIGS. 1 and 4, the filling fitting 1 possesses a radially extended section 3 and a section 4, located thereunder. This section 4 serves to affix the upper end of the filling fitting 1 onto a filling tube 5. If, here and in the following, in regard to a component, the word "under" is used, what is meant thereby, is a side of the component, which, in the state of assembly, is proximal to the tank interior. Conversely, "above" indicates a side of a component, which is remote from the interior of the fuel tank.

The sections 3 and 4, including the wall 6 of the filling fitting, are made of metal. The tank closure 2 lies in an upper zone, bordered by the wall 6 of the section 3. In order to fix the tank closure 2 in that position, and to assure a guidance for a handheld, pistol feed nozzle, in the extended section 3 of the fitting, is placed a shaped insert 7, upon the upper end face of which the tank closure lies, and which has a recess 8. The recess 8 leads, with diminishing diameter, from below to the interior of the filling tube 5 which is in connection with the restricted filling channel 9.

The tank closure possesses, as principal components, a carrier 10, a closure cover 13, a closing ring 14, a closure component 15, a helical spring 16 and a guide shell 17, whereby the closure component 15 the helical spring 16 and the guide shell 17 are all placed on the closure cover 13.

The carrier 10 is essentially a section of a tube with a somewhat cylindrical wall 18 and a transverse wall 19. The transverse wall 19 is for the entry of a nozzle pistol (not shown) via entry opening 20, which is penetrated to serve for the inflow of the fuel. The entry opening 20 is eccentrically located in relation to the wall 18 of the carrier 10, and possesses, all together, 3 equally spaced opening sections 23 which extend outward. Above, on the transverse wall 19 is formed a cylindrical wall section 24, which runs essentially concentric to the central, longitudinal axis 25 of the inlet opening 20. The cylindrical wall section 24 extends itself, however, not to the complete extent of a full circle but rather through an arc of about 110°. This angular zone forms a recess 26 for the closure ring 14, which is essentially a tubular section. The outside diameter of the same is so measured that it fits with little radial play into the recess 26, which is bordered by the wall section 24. The wall section 24 transitions on its ends 27 to a somewhat radial extending wall area 28, 29 in the inner side 30 of the wall 18 of the carrier 10.

In the operation of mounting, the closure ring 14 lies with its under edge face 33 on the upper side of the transverse wall 19. The wall section 24 transitions on the upper side into a wall 34, which runs transverse to the center axis 25 and is located on the inside 30 of the carrier 10. In the wall 34 is furnished a recess 35, which extends itself though an angular spread, which, essentially is the rotation zone of an externally protruding activation latch 36 on the closure ring 14. Penetrating the activation latch 36, is an axially running boring 37, onto which a somewhat staff-shaped activation instrument (not shown) engages. The activation latch extends itself radially to the outside into the recess 35. Its height is so dimensioned, that it does not essentially extend above the upper side of the wall 34. In the neighborhood of the recess 35, and in the wall 18 of the carrier 10 is to be found an incised recess extending itself axially downward. The above mentioned activation element passes through this recess. The arc length of the recess 38 is so measured, that the activation element, upon rotary connected activation of the closure ring 14, can move without obstruction. On the inner side of the closure ring 14 are to be found installed close to the under exposed face of the same, three circumferential sections 39, which extend radially toward the inside and are equally distanced, one from the other. The open width 40 of the intervening space which separates the circumferential sections 39 from one another, approximately represents the open space 44 of the opening sections 23.

Figure 2:
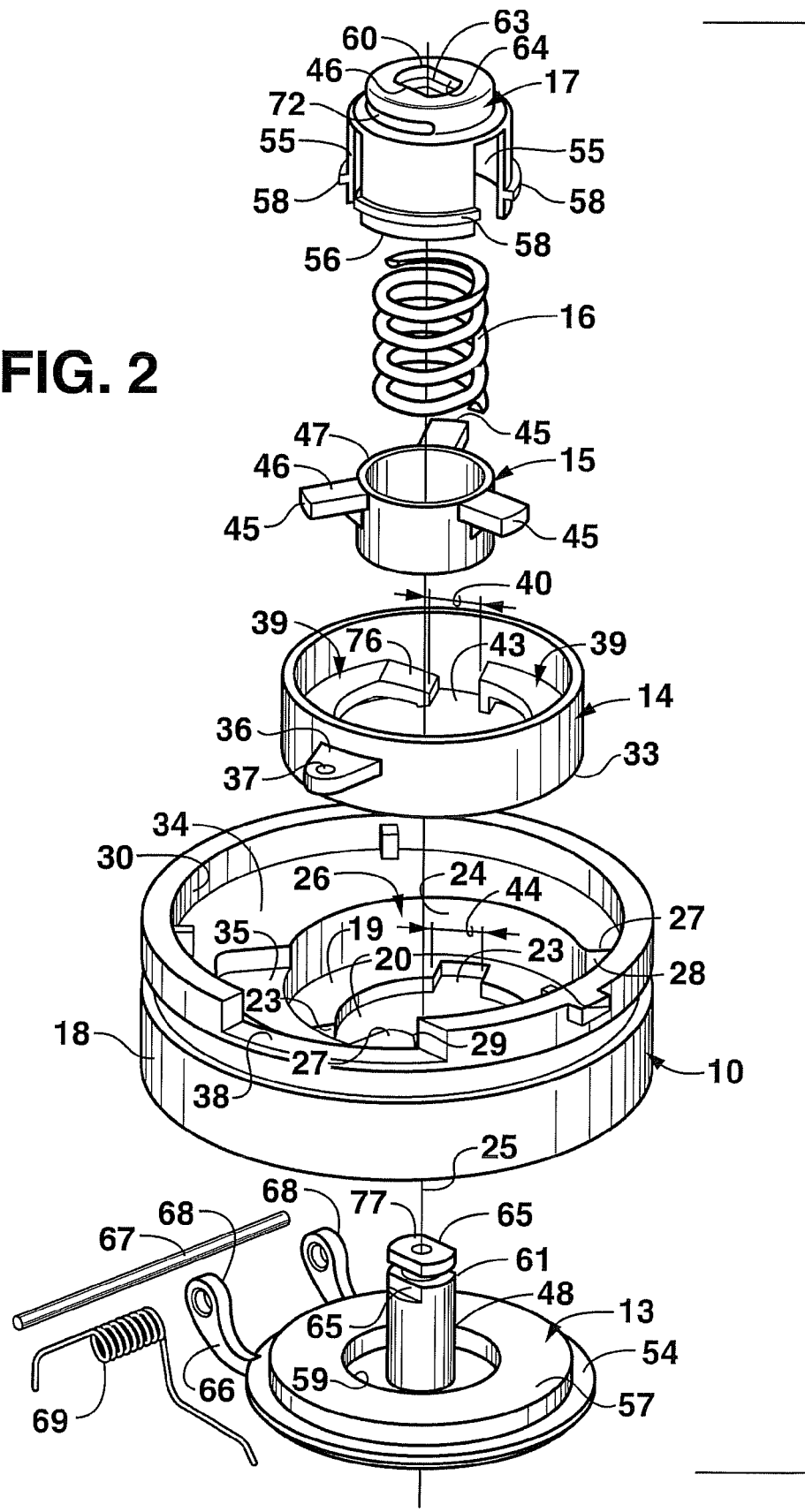
FIG. 2 is a perspective, exploded view of the tank closure.

Referring to FIGS. 2 and 3, the rotational turning points of the closure ring 14 are the intervening spaces 43 with the opening sections 23 shown, superimposed, one over the other.

The closure component 15 is essentially a tube section on the outside of which, three circumferential, equally distributed, radial closure elements 45 are placed. The upper side 46 of the closure elements 45 align with the upper face side 47 of the closure component 15 and appear with this at a common plane level, which when assembled, lies transverse to the central axis 25 of the input opening 20.

The closure component 15 is affixed to the closure cover 13 in such a manner, that it can be slipped a certain distance in the axial direction. This is carried out in the following way:

From the upper side 54 of the closure cover 13 projects a cylindrical shaped bolt 48, running parallel to the central axis or coaxial therewith. The closure component 15 circularly surrounds the bolt 48 in a coaxial manner with a radial separating distance. In this way, between the bolt 48 and the wall of the closure component 15 is formed an annular space 49. At the under end of the closure component 15 is a shaped first support flange 50, extending itself inward. This describes, with its inner edge, an opening 53, the diameter of which is slightly greater than the diameter of the bolt 48. (See FIG. 1B) The closure component 15 is thereby guided in its axial movement by the bolt 48. In the open condition, the closure component 15 lies, with its under side, that is, with its support flange 50, on the upper side 54 of the closure cover 13.

An additional axial guidance as well as a limitation of the axial moveability of the closure component 15 is created by the above mentioned guide shell 17. This possesses in its circumferential wall, three axial slots 55. These slots 55 open in the under facing end face 56 of the circumferential wall. These slots 55 are so dimensioned and so set apart from one another that they can accept the closure elements 45 of the closure component 15 and can guide in the axial direction. The guide shell 17 sits with its under end face 56 on the upper side 54 of the closure cover 13, and at that location, it is surrounded by an annular sealing element 57 affixed to the upper side 54 of the closure cover 13. With an axial separating distance from the end face 56 of the guide shell 17 is to be found on the outer circumference thereof, a radially outward extending flange 58. This flange 58 protrudes over the inner edge area of the sealing element 57 and fixes this in the axial direction on the upper side 54 of the closure cover 13. A stabilization in the radial direction is thereby assured in that an enclosed central opening 59 of the annular shaped sealing elements 57 has a diameter that is comparable with the outside diameter of the under end of the guide shell 17.

A second support flange 60 on which the helical spring 16 abuts with its upper end is a part of the upper end of the guide shell 17 and extends itself radially toward the center. The support flange 60 borders an opening 63, which possesses two, oppositely situated, parallel rim areas 64. These areas coact in the concept of a rotational movement fixation with flat surfaces 65 on the free end of the bolt 48 (see FIG. 2). For the axial setting of the guide shell 17, the bolt 48 possesses, proximal to its free end, a circumferential groove 61. Into this groove a somewhat U-shaped clamp element engages (clamp element not shown), which is pushed into two oppositely positioned recesses 72 underneath the support flanges 60 of the guide shell 17. In the bolt 48 is available an axially running, threaded boring 71. This serves for the positioning of a cover plate (not shown). The cover plate forms a planar, flat wall area onto which the fuel-input nozzle can be set and thereby the closure cover can be pivoted below.

On the rim of this closure cover 13 are two tangential pivot arms 66 placed at a separating distance, one from the other. In the free ends of pivot arms, remote from the pivot axle, two through-bored, elongated holes 68 are present. The longitudinal direction of the elongated holes 68 runs parallel to the central axis 25 of the inlet opening 20, that is to say, at right angles to the expanded plane level of the transverse wall 19. Between the pivoting arms 66 is inserted a leg spring 69, the coil of which is penetrated by the pivot axle 67. One leg 70 of the spring 69 abuts the carrier 10 and the other leg 73 contacts the underside of the closure cover 13, thereby holding the cover 13 in its closed position. Into this, the sealing element 57 is pressed against the underside of the opening rim of the transverse wall 19 thus forming a sealing seat 75 in that place.

Figure 1B:
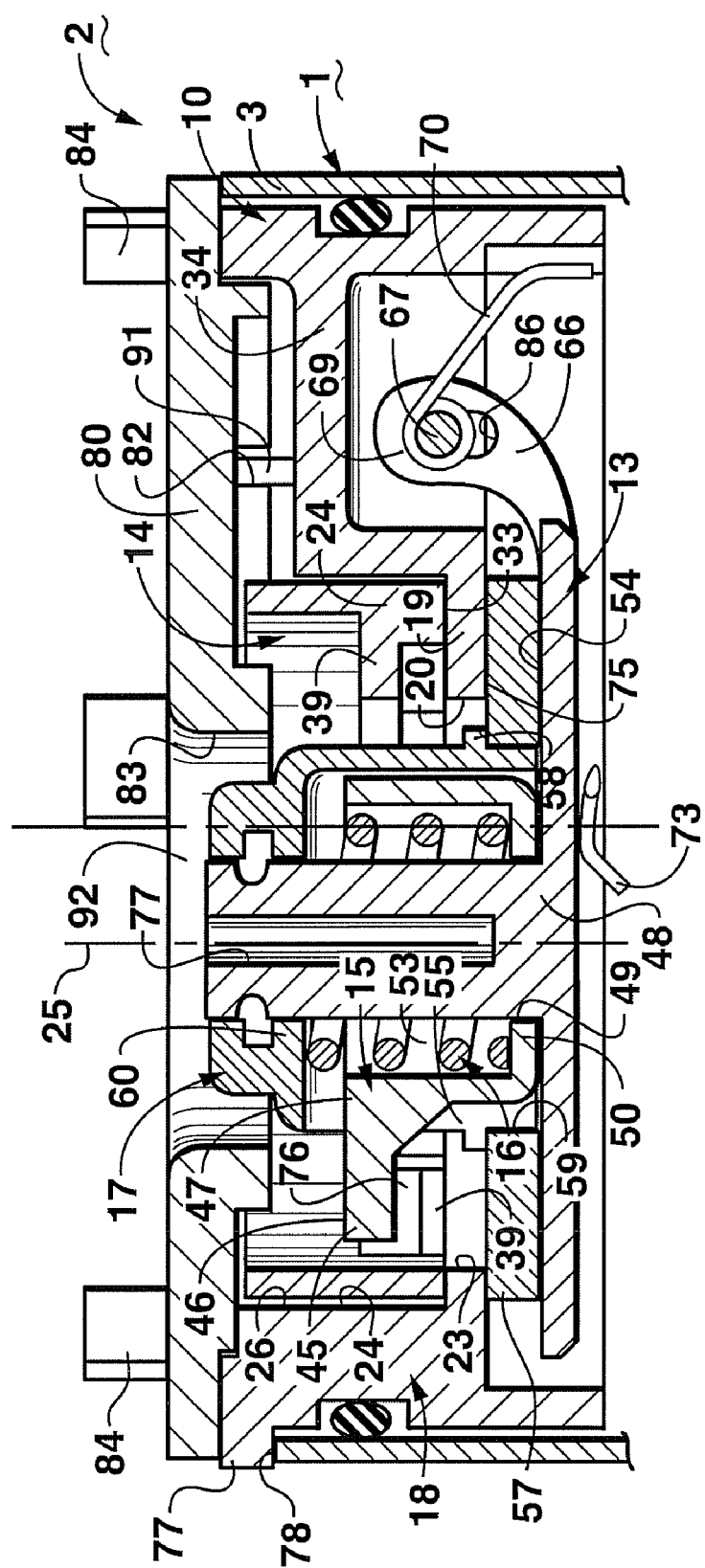
FIG. 1B is an enlarged view of the tank closure of FIG. 1A.

If the closure ring 14 finds itself in its illustrated position in FIG. 1B, and FIG. 3, then the closure element 45 is superimposed with the available intervening space 43 between the inner circumferential sections 39. As a result, the closure cover 13, upon the penetration of a fuel-feed nozzle into the entry opening 20, is pivoted in an arc downward. After the filling of the tank, or the removal of the nozzle, then the closure cover 13, because of the torque of the leg spring 69, retracts into its closed position. For the closure in this position, the closure ring 14, starting from the rotational position in accord with FIG. 3, turns clockwise with the aid of an activation element (latter not shown). When this occurs, then the circumferential sections 39 are pushed beneath the closure element 45 of the closure component. In order to ease this passage, the end of the circumferential section 39, which is pointing in the direction of the rotation, is tapered down, and thus offers the upper side of a run-on surface or ramp 76. With this surface 76, the closure element 45 is next picked up and the closure component 15 is axially lifted against the force of the helical spring 16. The closing force exercised by the closure component 15 is thus not directly transmitted to the sealing element 57, but rather indirectly by way of the spring 16 onto the sealing element 57 and finally to the sealing seat 75. Thus assurance is given that in the case of conditions caused by manufacture or by tolerance variations which arise during the life of operation, the sealing element 57 is pressed with an equal, lasting, plane-parallel oriented force on the seal seat 75. An alignment in regard to tolerance deviations is supported by the elongated openings 68, which allow a movement of the closure cover 13 in the axial direction, as well as in the direction of the central axis 25 of the inlet opening 20.

The tank closure 2 or the carrier 10 with its corresponding related components, as has been already described above, is inserted in the upper section 3 of a filling fitting 1. In order to assure a non-rotatable fixation, the carrier 10 possesses on its outer side a detent projection 77, which can engage itself in a complementary cutout recess 78 in the exposed face of the filling fitting 1. The filling fitting 1, or the upper section 3 thereof possesses another recess 79 (FIG. 3), which is located in the area of the recess 38 of the carrier 10. The recess 79 serves for the penetration of an activation element and also for the penetration of an activation rod which coacts with the boring 37 of the closure ring. The activation of the closure ring 14 can, of course, be done in a different manner, such as by means of a toothed bar, which would engage itself in a toothed ring on the outside circumference of the closure ring 14. Furthermore, it is worthy of consideration, that the closure ring is not only rotationally active on one, but on two oppositely situated positions.

The filling fitting 1 is, on the upper side, closed by a cover 80. This possesses an opening 83. The opening 83 is so dimensioned that a fuel nozzle can be inserted therein without hindrance and that the cover 80 covers the movable and sensitive parts of the tank closure 2. That is, it covers the radial, outward projecting closure elements 45.

For the axial securement of the tank closure 2 in the filling fixture 1, the upper section 3 has axial projecting bending latches 84, which can be bent inward after the positional placement of the tank closure 2 in the filling fitting 1. Accordingly, the latches 84 hold the tank closure in its proper position. In the cover 80 are rim placed recesses 85, which accept the latches 84 after they have been bent as described.

On the underside of the cover 80 is to be found an axially separated apron 81. The outside diameter of the apron 81 is slightly smaller than the diameter of the inside of the wall 18 of the carrier 10 in their upper area. The cover 80 is, in this manner, fixed in the radial direction on the filling fitting 1. For rotationally fixing the cover 80 onto the filling fitting 1, recesses 82 (FIG. 1B) are made in the apron 81 with equal circumferential spacing and extending axially. Into these recesses 82 engage the frictionalized projections 91, which are made on the inner side 30 of the carrier 10.

A Second Embodiment

Figure 5:
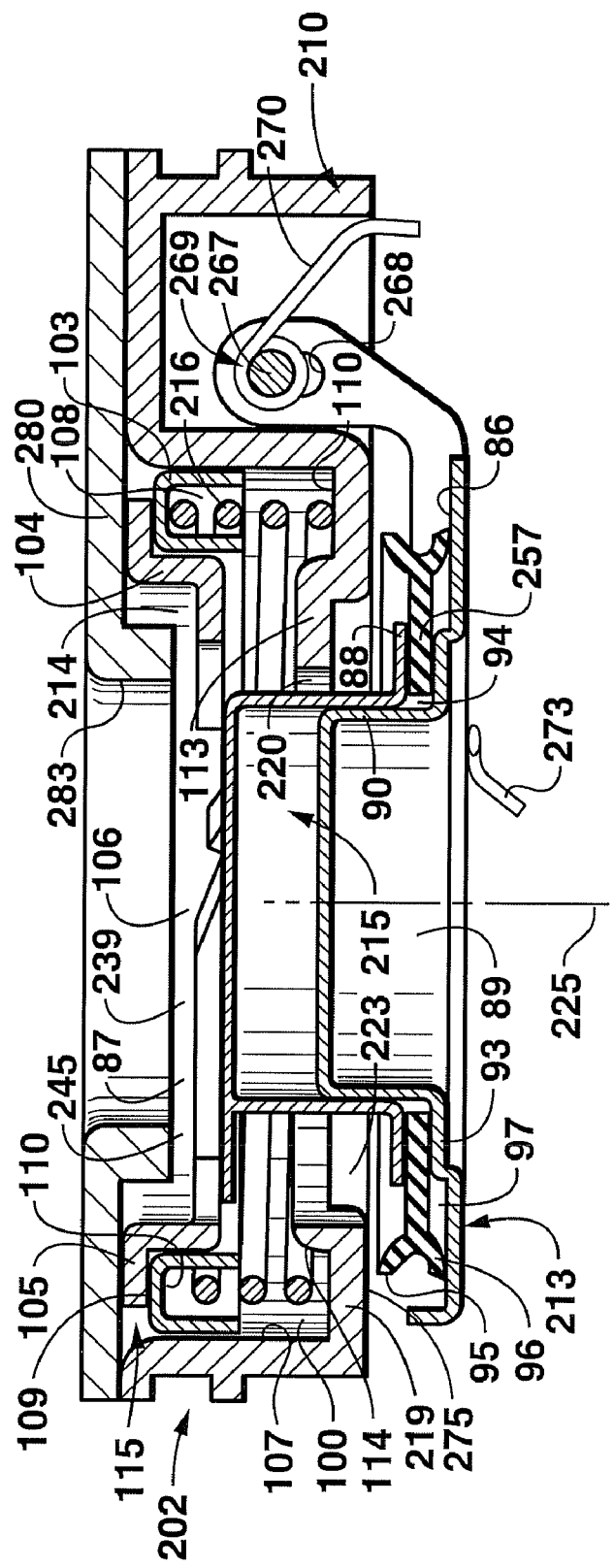
FIG. 5 is a cross sectional view of another embodiment of a tank closure apparatus.
Figure 6:
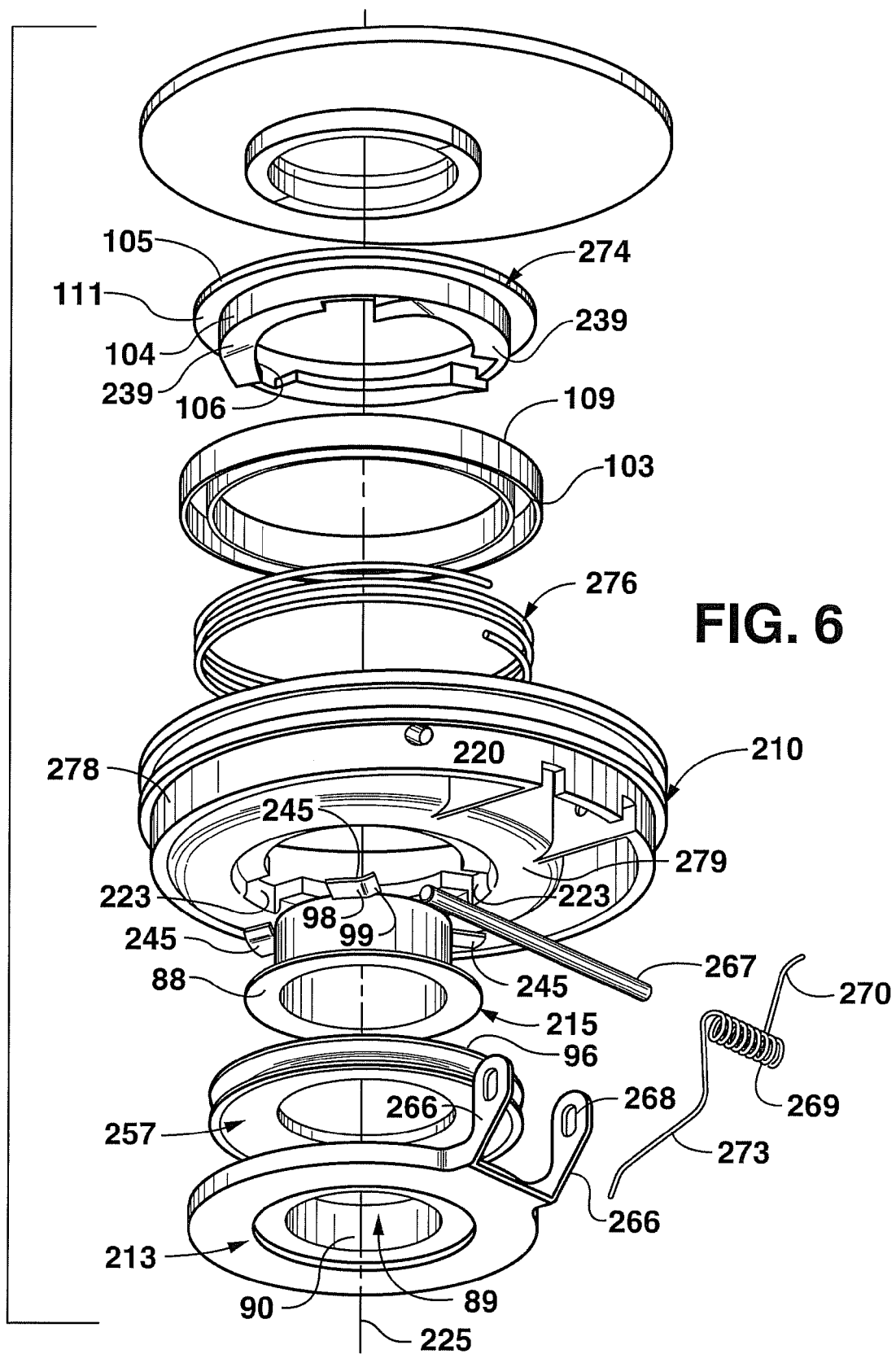
FIG. 6 is a perspective, exploded view of the tank closure apparatus of FIG. 5.

In FIGS. 5 and 6 is shown an alternatively formulated tank closure 2. In the following, the reference numbers common to the first embodiment are employed, when components of the same or equivalent functions are described. For better differentiation, the reference number is prefixed by the numeral "2". Contrary to the first embodiment, the tank closure of FIGS. 5 and 6 does not show the entire closure mechanism, but only that closure component 215 placed on the upper side 86 of the closure cover 213. Likewise, a designed spring element represented as helical spring 216 is placed under stress between the closure ring 214 and the transverse wall 219 of the carrier 210. In the transverse wall 219 likewise, relative to the carrier 210, is an eccentrically placed inlet opening 220 having opening sections 223 extending toward the outside. The opening sections 223 allow, as in the case of the first embodiment, the through swing of the closure element 245 of the closure component 215 upon the opening of the closure cover 213. Also the inlet opening 220, or the central longitudinal axis 225 of the same, is eccentrically placed in relation to the carrier 210.

The closure component 215 can be considered as a tube section, closed off at the top with a wall 87. This wall 87 forms a wall area for the opening of the closure cover 213 with the aid of the fuel nozzle. On the underside of the tube section is constructed a flange 88, which extends radially outward. The closure cover 213 possesses a central, bowl shaped projection 89, bulged upward, and defining a cylindrically shaped side wall 90. The closure component 215 is placed with its under end on the projection 89 and is securely bound thereto indicated schematically by attachment area "A".

The closure flap 213 is made of metal. If the closure component 215 is likewise made of metal, then for proper connection of the pieces, point-welding would be offered. The closure component 215 is pushed onto the projection 89 to the extent that between the flange 88 thereof and the projection embracing area 93 of the closure cover 213, a crack 94 is formed, which accepts within it, the radial inner lying area of the ring shaped designed sealing element 257, whereby this is affixed to the upper side of the closure cover 213. The sealing element 257 acts with the sealing seat 275 of the carrier 210 not as a flat contact, but rather as a linearly contact and acts in unison with one of its outer edges being a sharply upward inclined thick lip 95. A similar thick lip 96 extends likewise from the outer edge of the sealing element 257 on a slant to below. The two thick lips 95, 96 assure that the sealing element 257, even in a case of unfavorable tolerance situations, the helical spring 216 presses with sufficient force and consequently, all points on the sealing seat 275 are uniformly under pressure.

In the area of the under thick lip 96, the closure cover 213 is pulled downward, so that between the underside of the sealing element 257 and the upperside 86 of the closure cover 213 a crack 97 is present. This enables an elastic play of the under thick lip 96. The closure elements 245, which are in the area of the upper end face of the closure component 215, possess a section 98, which runs transverse to the central longitudinal axis, that is to say, parallel to the level of the plane of the closure cover 213, and which section 98 has a subsection inclined sharply upward, the underside of which form the run-on ramp 99.

The carrier 210 possesses an essentially cylindrically shaped recess 100 on the upper side, which is off-centered, but somewhat concentric to the central longitudinal axis 225. In this are placed the closure ring 214, the helical spring 216 and a slide ring 103. The closure ring 214 is essentially a tube section with a cylindrical wall 104 on the upper side of which is a support flange 105, which extends itself radially to the outside and is loaded on its underside by the helical spring 216. The closure ring 214 has on its under end a circumferential section 239, which extends itself radially inward and operates in common with closure element 245. The circumferential sections 239 possess sharply, downward inclined sections, which coact with the upper inclined sections 99 of the closure element 245, thereby forming counter slants 106.

The helical spring 216 supports itself not directly, but by means of the interlay of the slide ring 103 on the underside 111 of the support flanges 105. The slide ring 103 exhibits, in cross-section a "U" profile which is open downwards, and in which the helical spring 216 at least can extend for at least one winding and abuts itself therein. The slide ring 103 is so measured in the radial direction that it fills in radial direction with minimum play an available annular space 108 between the sidewall 107 of the recess 100 and the cylinder wall 104 of the closure ring 214. The play, in this positioning, is so dimensioned, that a hindrance-free rotation activation of the closure ring 214 is possible. In this connection, the plane-parallel design of the upper side 109 of the slide ring 103 and the underside 111 of the support flange 105 is observable. The helical spring supports itself with its under spring end on the upper side 110 of the transverse wall 219. For the centering and radial securement of the under spring end, the embracing area 113 about the entry opening 220 of the transverse wall has been elevated as a kind of collar. Thereby on the upper side 110 is formed a shoulder 114 extending radially outward and encompassing the under end of the helical spring 216.

The upper side of the tank closure 202 is likewise closed by a cover 80 with a central opening 283. The cover 280 affixed (not shown) in a manner to prevent axial movement and rotation. Between the underside of the cover 280 and the upper side 109 of the closure ring 214 is made available an opening 115, into which the supporting flange 105 can extend. In the case of an application of force from the helical spring 216 on the support flange 105 then this presses on the underside of the cover 280. (See FIG. 6.)

A Third Embodiment

Figure 7:
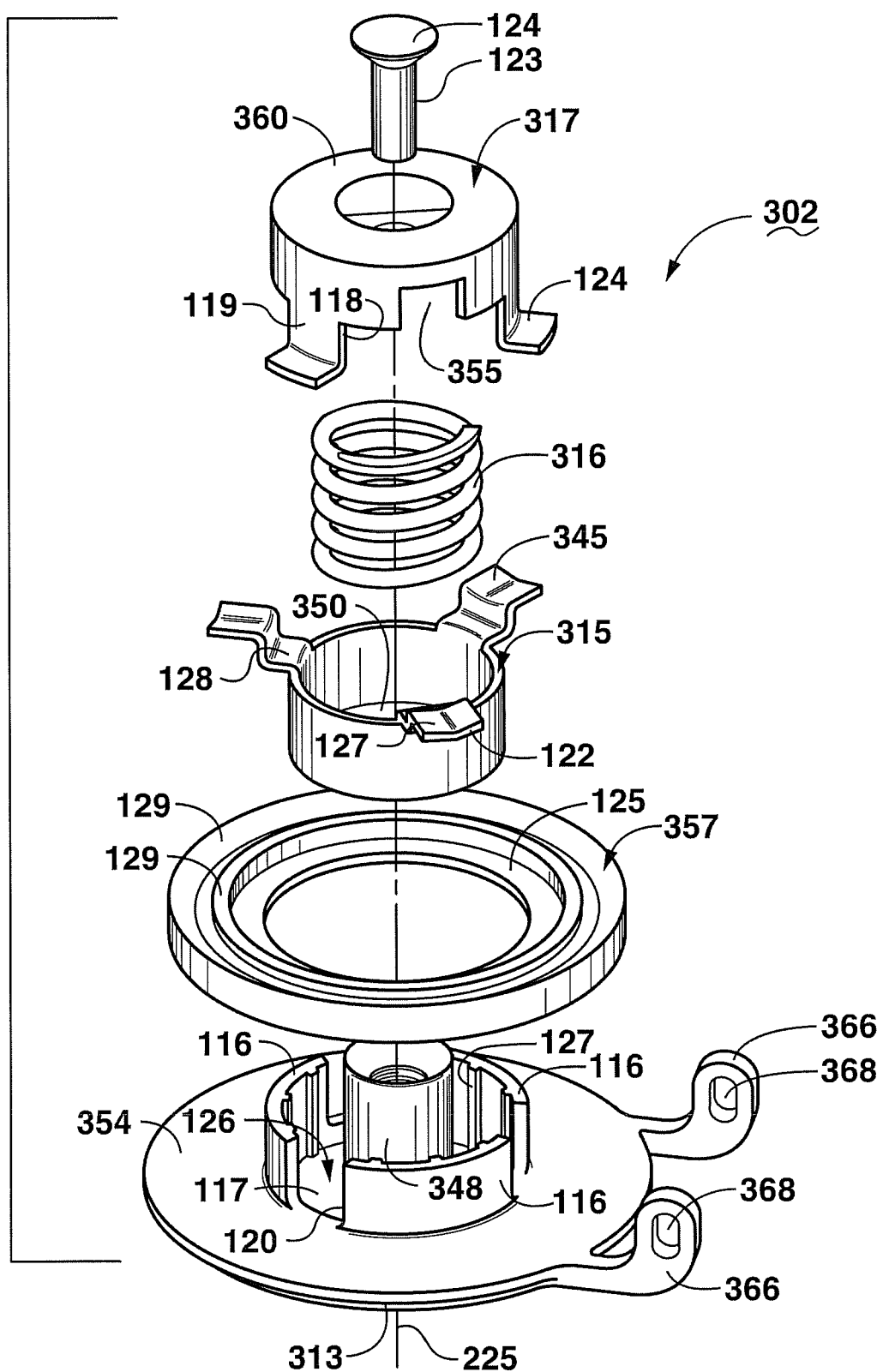
FIG. 7 is a perspective exploded view of a third embodiment of the invention.

In FIG. 7 are shown the principal components of a tank closure, in a manner which is a variation of the tank closure in accord with FIG. 1 to FIG. 4. For the description, the reference numbers of former embodiments, when components are the same or equivalent functions are to be illustrated, will be again used. For improved differentiation the reference numbers will have a prefix of "3". In FIG. 7, for the sake of clarity of a general view, the carrier and the closure ring of the tank closure 302 are omitted. The affixments to prevent rotation of the guide shell 317 on the closure cover 313 is done here via an effective shape fit in the direction of rotation between the two parts. This shape fit operates in the following manner:

Three wall sections 116 protrude axially from the upper side 354 of the closure cover 213. Interposed circumferentially between the wall sections 116 are respective spaces 117. The under section of the axial slots 355 of the guide shell 317 is respectively circumferentially widened and forms a recess 318 into which the wall sections 116 of the closure cover 313 can enter in a shape-fitting manner. The wall sections 116 remain respectively standing between two recesses 118, which form respective axially running webs 119. The width of each web 119 is so dimensioned that it fits into the intervening space 117. In this manner, the guide shell 317 is prevented from rotating on the closure cover 313. For the axial fix of the guide shell 317 there is provided centrally, an internally threaded boring 120 in a bolt 348 into which a screw 123 can engage. The screw 123 possesses a countersunk head 124. During assembly, this upper side aligns with the upper side of the guide shell 317. The under end 124 of the web 119 is bent out and stands radially outward from the circumferential surface of the guide shell 317. During assembly, an inner rim area 125 of the sealing elements 357 is pressed by the ends 124 against the upper side of the closure cover 313.

The helical spring 316 is stressfully inserted between the first support flange 350 of the closure component 315 and the second support flange 360 of the guide shell 317. The closure component 315 lies with its under longitudinal section in an available annular space 126 between the bolt 348 and the wall section 116, which is radially separated therefrom. The wall sections 116 form thereby an axial guide for the closing component 315 upon the axial movement of the same during the closure operation and the releasing of the closure cover 313. In order to achieve a disturbance-free guidance of the closure component 315, axially running ribs 127 project from the inner side of the wall section 116. These ribs 127 coact with the outside of the closure component 315 in the concept of a sliding-pair. The closure elements 345 are similarly formed in the manner of any of the embodiments of FIGS. 5 and 6. They possess also a section 121 running transverse to the central longitudinal axis 325 and an inclined, upward slanted section, the underside of which forms an run-on ramp 122. They are, however, placed on the upper face of the closure component 315 via a section 128, which is bent at right angles, so that the stressed plane level they form, possesses an axial intervening space to the face side of the guide shell 317. The sealing element 357 possesses on the upper side a standing edge located thick lip 129.

The carrier 10 and the closure cover 13 are made from a maximum strength and especially permeation-free plastic; for instance, POM, PA-6.6 with fiber reinforcement and PPA. From the standpoint of structural strength, the closure ring 14, the closure component 15 and the guide shell 17 can be stamped from sheet metal. The carrier 10, as shown in the examples of FIG. 1 to FIG. 6, can be in a separate entity which can be inserted into a fuel fitting 1. Consideration can be given to the possibility, that the carrier 10 can be a part of the fuel fitting 1, for example, integrated on the inner wall of the same, and upon the release of the inlet opening 20 retract radially to the inside.

While preferred embodiments of the invention have been shown and described, those skilled in the art will recognize that other changes and modifications may be made to the foregoing embodiments without departing from the scope and spirit of the invention. For example, specific shapes of various elements of the illustrated embodiments may be altered to suit particular applications. It is intended to claim all such changes and modifications as fall within the scope of the appended claims and their equivalents. Moreover, references herein to "top," "lower," "bottom," "upper," "upward," "downward," and "side" structures, elements, geometries and the like are intended solely for purposes of providing an enabling disclosure and in no way suggest limitations regarding the operative orientation of the exemplary embodiments or any components thereof.

"A Filling Fitting for a Motor Vehicle . . ."
Parts and Reference Number List

| | |
|---|---|
| 01 | Filling fitting |
| 02 | Tank closure |
| 03 | Section |
| 04 | Section |
| 05 | Inlet tube |
| 06 | Wall |
| 07 | Insert |
| 08 | Recess |
| 09 | Inlet passage |
| 10 | Carrier |
| 13 | Closure cover |
| 14 | Closure ring |
| 15 | Closure component |
| 16 | Helical spring |
| 17 | Guide shell |
| 18 | Wall |
| 19 | Transverse wall |
| 20 | Entry opening |
| 23 | Opening section |
| 24 | Cylindrical wall section |
| 25 | Centerline axis (longitudinal) |
| 26 | Recess |
| 27 | End |
| 28 | Radial wall area |
| 29 | Radial wall area |
| 30 | Inner side |
| 33 | Under face |
| 34 | Wall |
| 36 | Activation latch |
| 37 | Boring |
| 38 | Recess |
| 39 | Circumferential section |
| 40 | Open width |
| 43 | Intervening space |
| 44 | Open space |
| 45 | Closure element |
| 46 | Upper side |
| 47 | Upper face |
| 48 | Bolt |
| 49 | Ring space |
| 50 | First support flange |
| 53 | Opening |
| 54 | Upper side |
| 55 | Axial slot |
| 56 | Under face side |
| 57 | Sealing element |
| 58 | Flange |
| 59 | Central Opening |
| 60 | Second support flange |
| 61 | Groove |
| 63 | Opening |
| 64 | Edge area |
| 65 | Flat area |
| 66 | Pivot arm |
| 67 | Pivot axle |
| 68 | Elongated hole (oval) |
| 69 | Arm spring |
| 70 | Arm |
| 71 | Threaded boring |
| 72 | Cut-out |
| 73 | Leg |
| 74 | Underside |
| 75 | Seat for sealing means |
| 76 | Slant on 39 |
| 77 | Detent |
| 78 | Cut-out |
| 79 | Cut-out |
| 80 | Cap |
| 81 | Apron |
| 82 | Opening |
| 83 | Opening |
| 84 | Bent latch |
| 85 | Cutout |
| 86 | Upper side |
| 87 | Wall |
| 88 | Flange |
| 89 | Projection |
| 90 | Side wall |
| 91 | Friction projection |
| 92 | Wall area |
| 93 | Area |
| 94 | Opening, crack |
| 95 | Thick lip (seal) |
| 96 | Thick lip (seal) |
| 97 | Opening |
| 98 | Section |
| 99 | Ramp incline |
| 100 | Opening |
| 103 | Slide ring |
| 104 | Cylindrical wall |
| 105 | Support flange |
| 106 | Counter ramp |
| 107 | Side wall |
| 108 | Ring space |
| 109 | Upper side |
| 110 | Upper side |
| 111 | Underside |
| 113 | Area |
| 114 | Shoulder |
| 115 | Opening |
| 116 | Wall section |
| 117 | Intervening space |
| 118 | Recess |
| 119 | Web |
| 120 | Threaded boring |
| 121 | Section |
| 123 | Screw |
| 124 | End |
| 125 | Edge zone |
| 126 | Ring space |
| 127 | Rib |
| 128 | Bent section |
| 129 | Thick lipped seal |

The invention claimed is:

1. A filling fitting formation for a fuel tank of a motor vehicle having an automatic tank closure, the filling fitting formation comprising:
a fuel tank carrier with a transverse wall affixed thereto having an inlet opening therethrough for penetration of a fuel nozzle;
a closure cover pivotally carried on an axle disposed transverse to a central longitudinal axis of the inlet opening, a sealing element disposed on the closure cover coacting with a sealing element seat, which is formed by an opening rim of the transverse wall;
a closure component disposed proximate the closure cover, the closure component in a closed state of the closure cover penetrating the inlet opening with an axial section having a plurality of closure elements projecting radially therefrom; and
a closure ring disposed above the transverse wall the closure ring defining an inner circumferential section depending inwardly to coact with the closure elements, such that in a first rotational station of the closure ring, the inner circumferential section escapes engagement with the closure elements and in a second rotational station, the inner circumferential section contacts the closure elements from below, whereby the sealing element is pressed by an axial acting force on an underside of the transverse wall, the axial acting force generated by a spring element disposed in a force transmission path between the sealing element of the closure cover and the transverse wall.

2. A filling fitting in accord with claim 1, wherein the sealing element defines a lip projecting from an upper side of the sealing element for coaction with the sealing seat.

3. A filling fitting in accord with claim 1, wherein the spring element between the closure ring and the transverse wall is stressed in the closed state.

4. A filling fitting in accord with claim 3, wherein the spring element is a helical spring.

5. A filling fitting in accord with claim 3, further comprising a slide ring with a plane level extending transverse to the longitudinal axis of the inlet opening, the ring disposed between the spring element and the closure ring.

6. A filling fitting in accord with claim 5, wherein the slide ring is disposed in a ring space between an axial section of the closure ring and a wall of the carrier surrounding the closure ring.

7. A filling fitting in accord with claim 6, wherein the slide ring defines an inverted U-shape in profile.

8. A filling fitting in accord with claim 3, wherein the closure component is bowl shaped in cross-section with an opening directed downward, the closure component having a sidewall set upon and affixed to a cylindrical projection extending from an upper side of the closure cover and penetrating through a central opening of the sealing element.

9. A filling fitting in accord with claim 8, wherein the side wall carries a radially projecting flange overlaying an inner edge area of the sealing element.

10. A filling fitting in accord with claim 1 wherein the closure component and a spring element are placed on an outside of the closure cover such that the closure component is axially movable and is pressed urged by the spring element against the upper side of the closure cover.

11. A filling fitting in accord with claim 10, wherein the closure component is a tube section, the closure elements disposed thereon such that the spring element is compressibly inserted between a first support flange projecting radially inward from an under end of the closure component and a second support flange affixed on the closure cover.

12. A filling fitting in accord with claim 11, further comprising a guide shell affixed to the closure cover to prevent rotation or axial movement, the second support flange disposed on the guide shell, a circumferential wall of the guide shell coaxially embracing an axial section of the closure component, the guide shell having axial slots penetrated by the closing elements of the closure component.

13. A filling fitting in accord with claim 12, wherein the axial slots open on an under face of the guide shell.

14. A filling fitting in accord with claim 12 wherein the guide shell is affixed on a bolt to avoid rotation or axial movement, the bolt projecting from the upper side of the closure cover.

15. A filling fitting in accord with claim 14, wherein between the under end of the guide shell and the upper side of the closure cover an effective shape-fit is created in a direction of rotation.

16. A filling fitting in accord with claim 15, wherein the under face of the guide shell defines recesses spaced apart and engagable by complementary projections on the upper side of the closure cover.

17. A filling fitting in accord with claim 10, wherein the spring element is a helical spring.

18. A fuel fitting for a fuel tank having an automatic tank closure, the filling fitting comprising:

a carrier having a fuel inlet opening therein;

a closure ring disposed proximate the fuel opening, the closure ring defining a run-on section therein;

a closure component defining a plurality of closure elements depending therefrom and urged by a first spring element away from the fuel inlet opening and the run-on section in an open condition; and a closure cover urged against the carrier in the closed condition by a second spring element, the closure component urged into opposing rotational engagement with the run-on section to close the cover.

19. The fuel fitting as in claim 18, wherein the carrier defines a wall disposed about the fuel opening, the wall configured for positioning the closure ring and selective receipt of the closure elements in an open condition.

20. The fuel fitting as in claim 19, wherein the wall defines respective openings therein for receipt of the closure elements.

21. The fuel fitting as in claim 18, wherein the run-on section of the closure ring defines a ramp terminating in a gap for passage of one of the closure elements.

22. The fuel fitting as in claim 18, wherein the first spring element urges the closure elements along the run-on section in a screw-like direction and opens the closure cover in the open condition.

23. The fuel fitting as in claim 18, wherein the second spring element urges the closure cover to close and urges the closure elements toward the fuel inlet opening in the closed condition.

24. The fuel fitting as in claim 18, wherein the closure cover defines a sealing element thereon.

25. The fuel fitting as in claim 24, wherein the sealing element defines a plurality of lips depending therefrom, at least one lip slanting away from at least one other lip.

26. The fuel fitting as in claim 18, further comprising a guide shell disposed about the closure component, the first spring element compressibly disposed between the guide shell and the closure component.

27. The fuel fitting as in claim 26, wherein the guide shell defines a plurality of ends depending therefrom, and wherein the closure cover defines a plurality of wall sections depending therefrom, the ends disposed adjacent respective wall sections and configured to prevent rotation of the guide shell on the closure cover.

28. The fuel fitting as in claim 18, further comprising an extended section disposed about the carrier, the cover defining an opening therethrough for access to the closure component to open the fuel opening.

* * * * *

UNITED STATES PATENT AND TRADEMARK OFFICE
CERTIFICATE OF CORRECTION

| | | |
|---|---|---|
| PATENT NO. | : 7,147,018 B2 | Page 1 of 1 |
| APPLICATION NO. | : 10/909737 | |
| DATED | : December 12, 2006 | |
| INVENTOR(S) | : Krach et al. | |

It is certified that error appears in the above-identified patent and that said Letters Patent is hereby corrected as shown below:

Column 13, line 31, please delete the word "pressed".

Signed and Sealed this

Twenty-seventh Day of March, 2007

JON W. DUDAS
*Director of the United States Patent and Trademark Office*